United States Patent [19]

Patel et al.

[11] Patent Number: 5,018,148
[45] Date of Patent: May 21, 1991

[54] METHOD AND APPARATUS FOR POWER FAILURE PROTECTION

[75] Inventors: Ramesh U. Patel; Sithy So, both of Cambridge, Ohio

[73] Assignee: NCR Corporation, Dayton, Ohio

[21] Appl. No.: 317,384

[22] Filed: Mar. 1, 1989

[51] Int. Cl.⁵ .............................................. G06F 11/00
[52] U.S. Cl. ........................................ 371/66; 371/14; 371/62
[58] Field of Search ................... 371/66, 14, 62, 16.3; 365/227, 229; 307/66

[56] References Cited

U.S. PATENT DOCUMENTS

| | | | |
|---|---|---|---|
| 3,816,768 | 6/1974 | Stein | 307/296 |
| 4,234,920 | 11/1980 | Van Ness et al. | 364/200 |
| 4,320,450 | 3/1982 | Rose et al. | 364/200 |
| 4,323,987 | 4/1982 | Holtz | 371/66 X |
| 4,413,322 | 11/1983 | Waineo | 320/15 |
| 4,458,307 | 7/1984 | McAnlis et al. | 364/200 |
| 4,591,782 | 5/1986 | Germer | 371/66 X |
| 4,642,753 | 2/1987 | Easthill | 364/184 |
| 4,698,748 | 10/1987 | Juzswik | 371/66 X |
| 4,747,041 | 5/1988 | Engel et al. | 364/200 |
| 4,749,908 | 6/1988 | Stifter | 315/86 |
| 4,812,677 | 3/1989 | Perry | 371/66 X |
| 4,868,832 | 9/1989 | Marrington | 371/66 |
| 4,884,242 | 11/1989 | Lacy | 371/66 X |

Primary Examiner—Jerry Smith
Assistant Examiner—Robert W. Beausoliel
Attorney, Agent, or Firm—Wilbert Hawk, Jr.; Albert L. Sessler, Jr.

[57] ABSTRACT

Power failure protection for data processing apparatus is provided by the use of a standby power module which supplies power to the data processing apparatus when the normal supply is interrupted. Since damage to the data processing apparatus may result in the event of a sudden power failure, power failure protection software controls the data processing apparatus to cause periodic sampling of the state of the standby power module. During the time that the standby power module is operating, a timer in the data processing apparatus operates to measure the total time that said standby power module has operated since its last recharge. When said total time exceeds a predetermined amount which is based upon the minimum time during which the standby power module can supply power to the data processing apparatus, the power failure protection software initiates an orderly power shutdown of the data processing apparatus, in order to avoid a sudden power loss which might result in damage.

16 Claims, 3 Drawing Sheets

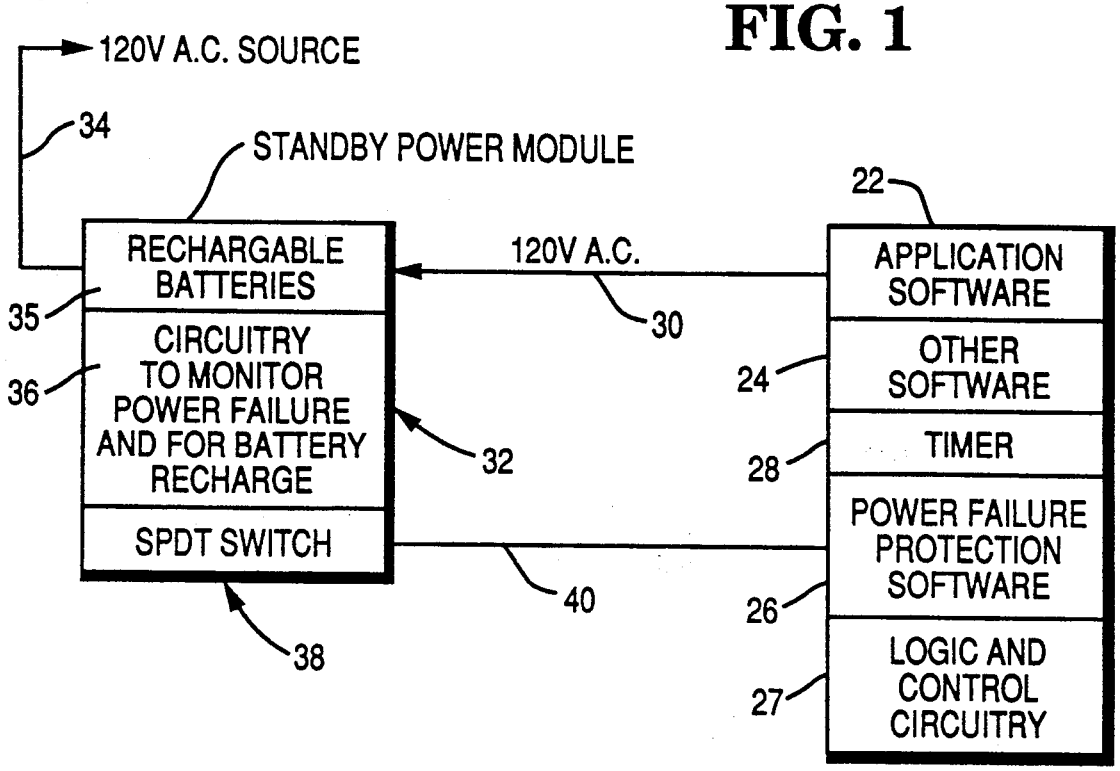
FIG. 1
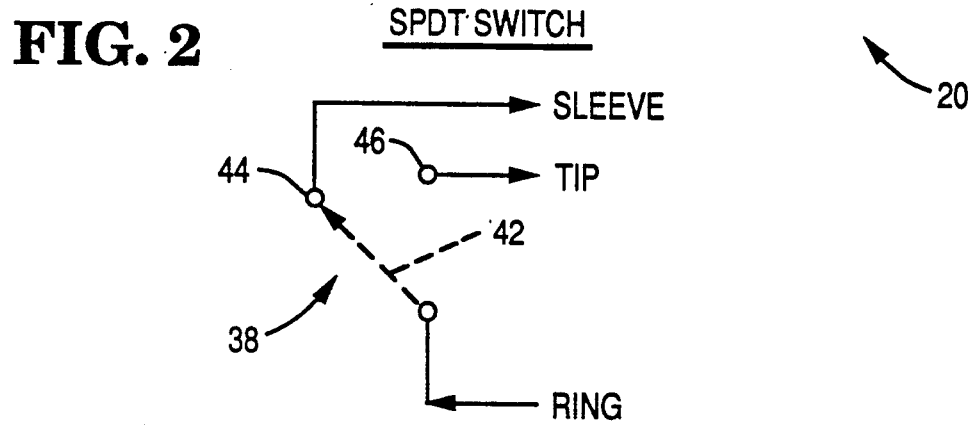
FIG. 2
FIG. 3
9 PIN D SHELL CONNECTOR
|  | SLEEVE PIN 6 | TIP PIN 8 |
|---|---|---|
| SPM ON | 0 | 1 |
| SPM OFF | 1 | 0 |
| NO SPM | 0 | 0 |
FIG. 4
CENTRONICS D SHELL CONNECTOR
|  | SLEEVE PIN 13 | TIP PIN 10 |
|---|---|---|
| SPM ON | 1 | 0 |
| SPM OFF | 0 | 1 |
| NO SPM | 1 | 1 |

METHOD AND APPARATUS FOR POWER FAILURE PROTECTION

BACKGROUND OF THE INVENTION

Standby power modules and uninterruptible power supplies are generally used in data processing installations for handling short-duration interruptions of normal power supplies. However, in some types of installations, special arrangements must be made to avoid sudden power failures which can occur if the auxiliary power supply is exhausted or somehow interrupted. Any software system which makes use of cache buffering is susceptible to loss of data or loss of file due to a sudden power failure. It is therefore important, where possible, to anticipate a power failure of the standby power module, and to provide an orderly shut-down of the data processing installation before such failure occurs.

SUMMARY OF THE INVENTION

The present invention relates to a method and apparatus for power failure protection, and more particularly relates to such a method and apparatus in which a standby power module is employed and in which the duration of use of said module is measured, so that the system being protected can be shut down in an orderly manner before available power from the standby power module is exhausted.

In accordance with one embodiment of the invention, a method for protection of a system embodied in a data processing apparatus having a normal power supply and a standby power supply associated therewith comprises the following steps: setting a timer in the data processing apparatus to a value equal to a period of time during which the standby power supply is capable of supplying power to said data processing system when said standby power supply is fully charged; repetitively checking the status of the standby power supply to determine whether or not said standby power supply is supplying power to said data processing apparatus in place of the normal power supply when said normal power supply is interrupted; starting operation of said timer when said standby power supply is found, during said repetitive checking, to be supplying power to said data processing apparatus; continuing to repetitively check the status of said standby power supply and stopping and starting the operation of said timer to provide a cumulative elapsed time in accordance with the termination and any subsequent commencement and termination of the supplying of power to said data processing apparatus by said standby power supply until the time remaining on the timer is exhausted; and shutting down the operation of said data processing apparatus if the standby power supply continues to supply power to said data processing apparatus after the time remaining on the timer is exhausted.

In accordance with another embodiment of the invention, apparatus for protection of a system against damage which may be caused by sudden power failure comprises: data processing means which includes logic and control circuitry, operating system software for controlling the logic and control circuitry to enable said data processing means to perform various functions, application software for causing the data processing means to perform specific routines, power failure protection software, memory means in which all of said software is stored, and a timer associated with said power failure protection software for timing the duration of events associated with said data processing means; a source of power for normally operating said data processing means; standby power means coupled to said source of power and to said data processing means for supplying power from said source of power to said data processing means, said standby power means also including auxiliary power means for supplying standby power to said data processing means in the event of loss of power from said source of power, means to recharge said auxiliary power means from said source of power, monitoring means to monitor any failure of power from said source of power and to initiate use of said auxiliary power means to supply power in the event of failure of power from said source of power, and switch means controlled by said monitoring means and settable in accordance with whether or not power from said auxiliary means is being supplied to said data processing means; and communications means coupled to said switch means and to said data processing means to periodically check the status of the switch means of the standby power means to determine whether the auxiliary power means is being used to power the data processing means, and whereby said power failure protection software causes said timer to run whenever said auxiliary power means is supplying power to said data processing means, said power failure protection software being operable to cause an orderly shutdown of said data processing means whenever said timer indicates that a predetermined amount of time has elapsed during which the data processing means has been powered by the auxiliary power means through one or more failures of said source of power, in order to avoid sudden power failure.

It is accordingly an object of the present invention to provide a method and apparatus for power failure protection.

A further object is to provide a method and apparatus for power failure protection in which a standby power module is employed and its use is timed to permit an orderly shutdown of the system being protected before available power from the standby power module is exhausted.

With these and other objects, which will become apparent from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIG. 1 is a block diagram showing a data processing apparatus and a standby power module associated therewith.

FIG. 2 is a diagram of the switch which forms a part of the standby power module.

FIGS. 3 and 4 are truth tables applicable to the switch of FIG. 2 with two different types of connectors for coupling the standby power module to the data processing apparatus.

DETAILED DESCRIPTION

Figure 5:
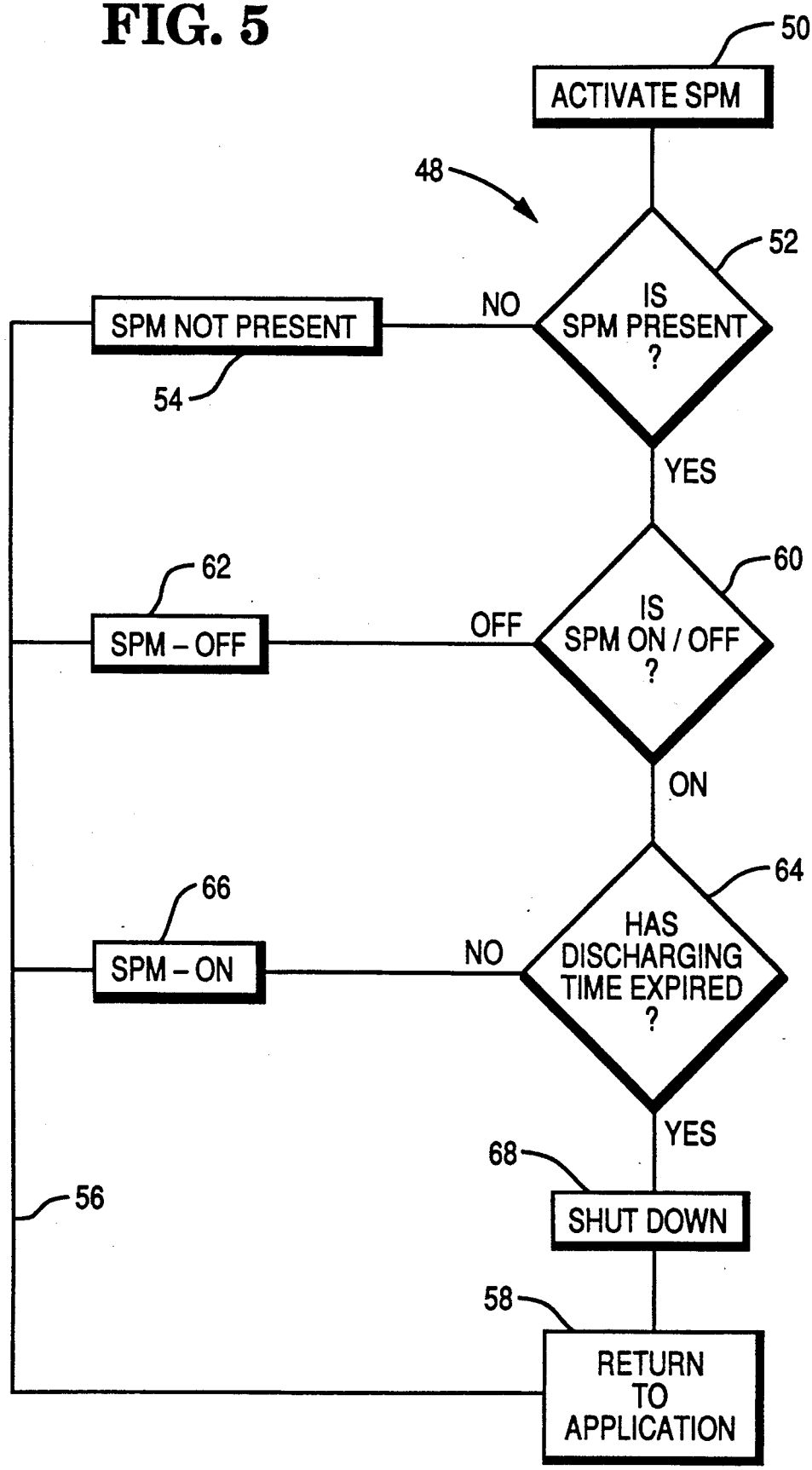
FIG. 5 is a flow diagram representing the power failure protection software of the present invention.

Referring now to FIG. 1, shown there is a data processing apparatus 20. Included as a part of the apparatus 20 is application software 22, other software 24 which may include operating system software, and power failure protection software 26. All of the software is stored in one or more memory devices included in the data processing apparatus 20. In addition, the data processing apparatus includes a timer 28. Other devices, such as logic and control circuitry 27, are also included in the data processing apparatus in order to enable it to carry out various operations in accordance with the software associated with it. However, these other devices are conventional and function in the normal operation of the data processing apparatus, so that it is not believed to be necessary to show or describe them specifically. The present invention may be embodied in an arrangement which includes any conventional type of data processing apparatus 20, one such type being the NCR 7003, manufactured by NCR Corporation, Dayton, Ohio.

Power is supplied to the data processing apparatus 20 through a cable 30. In the illustrated embodiment, the power is in the form of 120 volts AC, but the invention is not so limited and is applicable to other power sources. The power is supplied to the data processing apparatus 20 from a standby power module 32, which in turn obtains the power through a cable 34 which may be plugged into a standard power receptacle, such as a wall outlet.

Any suitable standby power module 32 may be employed. One such module is commercially available as model no. 998-062-7302 from NCR Corporation, Dayton, Ohio. It includes rechargeable batteries 35 to supply power to the data processing apparatus 20 in the absence of the normal power supply, circuitry 36 to monitor power failure and to enable battery recharging from the normal power source when the batteries become depleted, and after normal power has resumed, and a switch 38 settable by the hardware 36 to provide information to the data processing apparatus 20 concerning whether or not the standby power module 32 is coupled to the data processing apparatus 20 and, if so, whether or not it is supplying standby battery power to the data processing apparatus 20. The switch 38 is connected to the data processing apparatus 20 through a suitable connector 40, which may, for example, be a 9 pin D shell connector or a Centronics D connector. The standby power module 32 continuously monitors the normal power supply and automatically commences to provide power from its batteries to the data processing apparatus 20 in the event of a failure of the normal power supply.

FIG. 2 shows the switch 38 in somewhat greater detail. Any suitable form of electronic or mechanical switch may be used. As shown in FIG. 2, the switch is of the single pole, double throw type having a blade 42 which is movable under control of the circuitry 36 between a first position in which it engages a terminal 44 and a second position in which it engages a terminal 46.

As used in the present invention, the connector 40 may be considered to have three conductive elements or paths, represented in FIG. 2 by the designations ring, tip and sleeve, with the ring being connected to the blade 42 of the switch 38, the sleeve being connected to the terminal 44 and the tip being connected to the terminal 46.

FIGS. 3 and 4 show truth tables for the switch 38 with two illustrated types of connectors 40. Thus, FIG. 3 is applicable when a 9 pin D shell connector is used, and FIG. 4 is applicable when a Centronics D shell connector is used. It will be noted that the voltage levels are reversed as to significance between the two types of connectors, due to their structure, so that the manner of operation of the switch 38 by the circuitry 36 must be selected in accordance with the type of connector 40 which is used.

Referring, for example, to the truth table of FIG. 3, it will be seen that a low logic level on the sleeve of the connector 40 (associated with pin 6 of the connection of the connector 40 to the data processing apparatus 20) combined with a high logic level on the tip of the connector 40 (associated with pin 8) provides an indication to the data processing apparatus 20 that the standby power module 32 is connected to the data processing apparatus 20 and is currently supplying battery power to said apparatus. Conversely, it will be seen that a high logic level on the sleeve of the connector 40 combined with a low logic level on the tip of the connector 40 provides an indication that the standby power module 32 is connected to the data processing apparatus 20, but is not currently supplying battery power to said apparatus; in other words, the normal power supply is functioning properly. Finally, low logic levels on both the sleeve and the tip of the connector 40 indicate that the standby power module is not present in the system. Normally in such a case, power would be supplied directly to the data processing apparatus 20 from a 120-volt AC source.

Shown in FIG. 5 is a flow diagram of the power failure protection routine 48 which may be utilized in the data processing apparatus 20 to prevent damage to other software contained therein. The routine is initiated by a command contained in the application software which is being run to activate the standby power module 32, as represented in the block 50.

In the routine, a determination is first made by the data processing apparatus 20 as to whether or not the standby power module is present, as represented by block 52. It will be recalled that this determination is made by use of the switch 38. If a determination is made that a standby power module is not present in the system (block 54), the routine proceeds over path 56 to the block 58, and returns to the application program from which the routine 48 was initiated.

If the standby power module 32 is present, then the switch 38 provides information (block 60) to the data processing apparatus 20 as to whether the standby power module 32 is currently on (supplying power to the data processing apparatus because of a power failure of the normal power source) or off (not supplying power because the normal power source is functioning properly), as represented by block 62. If the standby power module 32 is off, the process continues via path 56 to return to the application program (block 58), as previously described.

In the case in which the standby power module 32 is found to be on, the process continues to block 64, in which a determination is made as to whether or not the predetermined discharging time for the standby power module 32 has expired. The discharging time is calculated on the basis of providing an assured minimum time during which the standby power module 32 will be capable of providing power to the data processing apparatus 20 with assurance that the power will not be exhausted and thus possibly cause a sudden power failure which could result in damage to the system. The calculation of this minimum time value depends upon a number of factors, such as the predetermined time duration for which the batteries of the standby power module are capable of providing satisfactory power, the number of units, if more than one, which the battery may have to service, the time required for the data processing apparatus 20 to perform an orderly shut down without damage, and a possible safety factor. Thus if it is determined that the assured total duration of adequate power delivery of the standby power module 32 is 56 minutes, that a maximum of four units will be serviced by said module, that a shut down time of two minutes is required, and that a safety factor of two minutes is desired, then the minimum time can be determined to be $56 \div 4 = 14$, minus $2 = 12$, minus $2 = 10$ minutes.

Accordingly, the timer 28 is initially set with a value of 10 minutes when the batteries 35 of the standby power module 32 are determined to be fully charged. A periodic checking of the standby power module 32 by the data processing apparatus 20 takes place, and each time that the standby power module 32 is found to be supplying standby power, the duration of such time period is taken off the timer 28. When the time remaining has decreased to zero, the discharging time is considered to have expired, as represented in block 64. It should be pointed out that after the standby power module 32 has been supplying standby power, and normal power comes back on, the circuitry 36 may cause the batteries 35 to be recharged. However, the system does not have the capability of measuring the effect of such interim recharging, and this factor is therefore ignored in operating the timer, which is reset to its initial setting only when a complete recharging of the batteries 35 has taken place. Such a complete recharging may take a considerable period of time, such as approximately sixteen hours for the batteries 35 which are suitable for use in the system described herein.

Returning now to FIG. 5, if it is determined in block 64 that the discharging time has not expired, the standby power module 32 continues to provide power, as represented by the "SPM-ON" block 66, and the process continues on path 56 to return to the application program, as represented by block 58.

On the other hand, if it is determined in block 64 that the discharging time has expired, the routine proceeds to shut down the data processing apparatus 20 on an orderly basis, as represented in block 68, after which the process returns to the application program (block 58).

Figure 6:
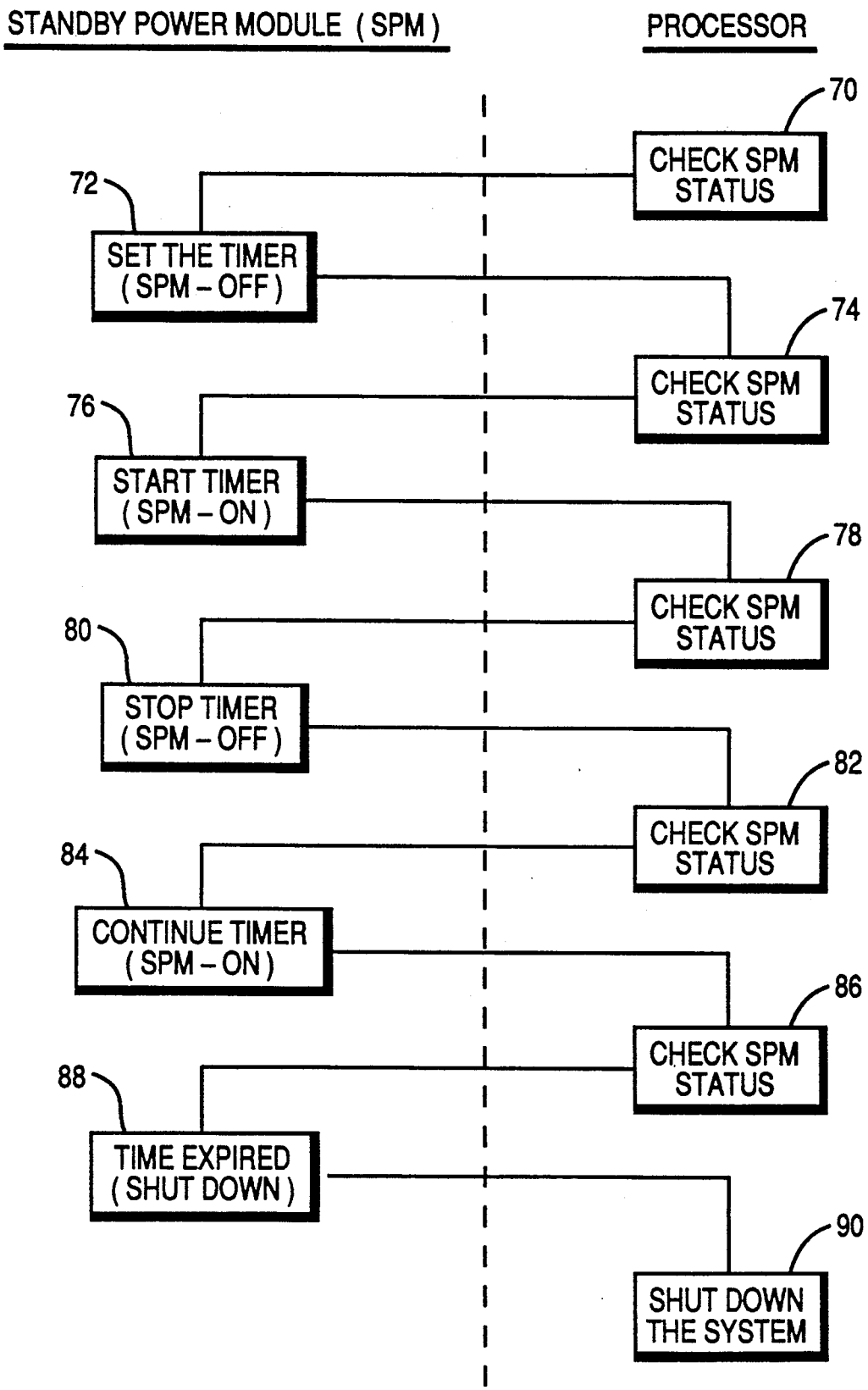
FIG. 6 is an event diagram, showing a series of events which may typically occur during operation of the data processing apparatus and the standby power module.

FIG. 6 illustrates a typical sequence of operation of the system of FIG. 1, in which the normal power supply is interrupted twice and the system is shut down.

As represented in block 70, the sequence begins with the checking of the status of the standby power module 32. In block 72, the timer 28 is set to its predetermined minimum duration value. At this time, the standby power module 32 is off and the batteries 35 are fully charged.

Periodic checking of the status of the standby power module 32 by the application software 22, acting through the data processing apparatus 20, takes place at suitable intervals, typically of about one minute. This checking is accomplished by applying a signal, typically every second, via the connector 40 to the blade 42 of the switch 38 of the standby power module 32. As previously mentioned, if the module 32 is in the system, the blade 42 is positioned to one of the two terminals 44 or 46, depending upon whether the module 32 is "on" or "off", and the signal to the blade 42 is therefore returned to the data processing apparatus 20 on one of the conductors contained in the connector 40, connected to either the terminal 44 or the terminal 46.

Thus in FIG. 6, after the timer has been set in block 72, the status of the standby power module 32 is checked in block 74, and for purposes of this example, it will be assumed that normal power has failed, and that the standby power module 32 is therefore on, as represented in block 76. Operation of the timer 28 is started at this point. Checking continues, as represented by block 78, and at the next, or a subsequent check, it is found that the standby power has been turned off (block 80), as a consequence of the normal power supply coming back on. Operation of the timer 28 is accordingly halted, with the setting of the timer reduced by the duration of the period that the standby power module 32 was in an "on" condition.

During further periodic checking (block 82), it is discovered that the standby power module 32 is once more on, and operation of the timer 28 is again commenced (block 84), from the setting at which it previously stopped. Continued checking of the module status (block 86) takes place. In this instance, it is assumed that the module 32 continues in an "on" status until the timer 28 has run down to its zero position (block 88). As soon as this happens, the software of FIG. 5 causes the system to shut down, as represented by block 68 in FIG. 5, and by block 90 in FIG. 6. This results in a return to the application program, as previously described (block 58 of FIG. 5).

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. A method for protection of a system embodied in a data processing apparatus having a normal power supply and a standby power supply associated therewith, comprising the following steps:

setting a timer in the data processing apparatus to a value equal to a period of time during which the standby power supply is capable of supplying power to said data processing system when said standby power supply is fully charged;

repetitively checking the status of the standby power supply to determine whether or not said standby power supply is supplying power to said data processing apparatus in place of the normal power supply when said normal power supply is interrupted;

starting operation of said timer when said standby power supply is found, during said repetitive checking, to be supplying power to said data processing apparatus;

continuing to repetitively check the status of said standby power supply and stopping and starting operation of said timer to provide a cumulative elapsed time in accordance with the termination and any subsequent commencement and termination of the supplying of power to said data processing apparatus by said standby power supply until the time remaining on the timer is exhausted; and shutting down the operation of said data processing apparatus if the standby power supply continues to supply power to said data processing apparatus after the time remaining on the timer is exhausted.

2. The method of claim 1, in which the time to which the timer is set is sufficiently less than the minimum time that the standby power supply is capable of supplying power, that sufficient standby power will be available for an orderly shutting down of the operation of said data processing apparatus without possible damage.

3. The method of claim 1, also including the step of checking for the presence of the standby power supply before repetitively checking the status of said standby power supply.

4. The method of claim 1, also including the step of recharging the standby power supply from the normal power supply when said normal power supply resumes operation after interruption.

5. The method of claim 4, in which said timer is reset to its original set value after a predetermined time has elapsed since the last use of the standby power supply, said predetermined time being sufficient to recharge said standby power supply fully from a totally depleted state.

6. The method of claim 1, in which said standby power supply automatically commences supplying power to said data processing apparatus when said normal power supply is interrupted.

7. The method of claim 1, in which the data processing apparatus does not distinguish between power supplied by the normal power supply and power supplied by the standby power supply.

8. The method of claim 1, in which the checking of the status of the standby power supply is accomplished by a switching means controlled by the standby power supply and coupled to the data processing apparatus.

9. The method of claim 8, in which the switching means is a single pole double throw switch.

10. The method of claim 1, also including the step of resetting the timer to an initial position when said standby power supply has been fully recharged.

11. The method of claim 1, in which the standby power supply comprises at least one battery.

12. Apparatus for protection of a system against damage which may be caused by sudden power failure, comprising:

data processing means which includes logic and control circuitry, operating system software for controlling the logic and control circuitry to enable said data processing means to perform various functions, application software for causing the data processing means to perform specific routines, power failure protection software, memory means in which all of said software is stored, and a timer associated with said power failure protection software for timing the duration of events associated with said data processing means;

a source of power for normally operating said data processing means;

standby power means coupled to said source of power and to said data processing means for supplying power from said source of power to said data processing means, said standby power means also including auxiliary power means for supplying standby power to said data processing means in the event of loss of power from said source of power, means to recharge said auxiliary power means from said source of power, monitoring means to monitor any failure of power from said source of power and to initiate use of said auxiliary power means to supply power in the event of failure of power from said source of power, and switch means controlled by said monitoring means and settable in accordance with whether or not power from said auxiliary means is being supplied to said data processing means; and communication means coupled to said switch means and to said data processing means, whereby said power failure protection software causes said data processing means to periodically check the status of the switch means of the standby power means to determine whether the auxiliary power means is being used to power the data processing means, and whereby said power failure protection software causes said timer to run whenever said auxiliary power means is supplying power to said data processing means, said power failure protection software being operable to cause an orderly shutdown of said data processing means whenever said timer indicates that a predetermined amount of time has elapsed during which the data processing means has been powered by the auxiliary power means through one or more failure of said source of power, in order to avoid sudden power failure.

13. The apparatus of claim 12, in which said predetermined time is less than the minimum time during which the auxiliary power means is capable of providing power to run the data processing means.

14. The apparatus of claim 12, in which the auxiliary power means comprises at least one battery.

15. The apparatus of claim 12, in which the switch means comprises a single pole, double throw switch.

16. The apparatus of claim 12, in which said timer is capable of accumulating elapsed times during a plurality of separate occasions during which the data processing means has been powered by the auxiliary power means because of failures of said source of power.

* * * * *